United States Patent
Jaworowski et al.

(10) Patent No.: US 9,738,791 B2
(45) Date of Patent: Aug. 22, 2017

(54) ANODIC-CATHODIC CORROSION INHIBITOR-CONDUCTIVE POLYMER COMPOSITE

(71) Applicant: UNITED TECHNOLOGIES CORPORATION, Hartford, CT (US)

(72) Inventors: Mark R Jaworowski, Glastonbury, CT (US); Sarah Arsenault, West Brookfield, MA (US); James T Beals, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 56 days.

(21) Appl. No.: 14/842,892

(22) Filed: Sep. 2, 2015

(65) Prior Publication Data

US 2015/0376419 A1    Dec. 31, 2015

Related U.S. Application Data

(62) Division of application No. 11/982,639, filed on Nov. 2, 2007, now Pat. No. 9,187,650.

(51) Int. Cl.

| | | |
|---|---|---|
| *C09D 5/08* | (2006.01) | |
| *C09D 5/02* | (2006.01) | |
| *C09D 5/24* | (2006.01) | |
| *C09D 7/12* | (2006.01) | |
| *H01B 13/00* | (2006.01) | |
| *C08K 3/22* | (2006.01) | |
| *C08K 9/10* | (2006.01) | |

(52) U.S. Cl.
CPC .................. *C09D 5/08* (2013.01); *C09D 5/02* (2013.01); *C09D 5/084* (2013.01); *C09D 5/24* (2013.01); *C09D 7/1291* (2013.01); *H01B 13/0026* (2013.01); *C08K 3/22* (2013.01); *C08K 9/10* (2013.01); *Y10T 428/26* (2015.01)

(58) Field of Classification Search
None
See application file for complete search history.

(56) References Cited

U.S. PATENT DOCUMENTS

| | | | |
|---|---|---|---|
| 5,866,652 A | 2/1999 | Hager et al. | |
| 6,206,982 B1 | 3/2001 | Hughes et al. | |
| 6,475,621 B1 * | 11/2002 | Kohli | ..................... C09D 5/002 |
| | | | 428/411.1 |
| 6,537,678 B1 | 3/2003 | Putnam et al. | |
| 6,548,590 B1 | 4/2003 | Koloski et al. | |
| 6,572,789 B1 | 6/2003 | Yang et al. | |
| 7,125,925 B2 * | 10/2006 | Sinko | ................... C08K 3/0008 |
| | | | 524/420 |
| 7,341,677 B2 | 3/2008 | Yu et al. | |
| 7,578,878 B2 | 8/2009 | Sinko et al. | |
| 7,759,419 B2 | 7/2010 | Stoffer et al. | |
| 7,794,626 B2 | 9/2010 | Horton | |
| 2003/0209293 A1 * | 11/2003 | Sako | ....................... C23C 22/34 |
| | | | 148/273 |
| 2004/0149963 A1 | 8/2004 | Sinko et al. | |
| 2004/0262580 A1 * | 12/2004 | Yu | .......................... C09D 5/082 |
| | | | 252/389.1 |
| 2007/0128447 A1 * | 6/2007 | Hazel | ..................... C23C 26/00 |
| | | | 428/426 |
| 2008/0175992 A1 | 7/2008 | Plieth et al. | |
| 2010/0151253 A1 | 6/2010 | Roth et al. | |

FOREIGN PATENT DOCUMENTS

| | | |
|---|---|---|
| WO | WO2005078158 | 8/2005 |
| WO | WO2007008199 | 1/2007 |

* cited by examiner

*Primary Examiner* — Nathan T Leong
(74) *Attorney, Agent, or Firm* — Bachman & LaPointe, P.C.

(57) ABSTRACT

A conductive polymer corrosion protective composite is provided which may be used as a coating for imparting corrosion protection to structures such as turbine engine components. The composite comprises an organic-inorganic component and corrosion inhibitive pigments comprising an anodic corrosion inhibitor and a cathodic corrosion inhibitor. The anodic corrosion inhibitor may be selected from the group consisting of compounds of vanadium, molybdenum, tungsten, and mixtures thereof. The cathodic corrosion inhibitor may be selected from the group consisting of cerium, neodymium, praseodymium, and mixtures thereof.

8 Claims, No Drawings

ANODIC-CATHODIC CORROSION INHIBITOR-CONDUCTIVE POLYMER COMPOSITE

CROSS REFERENCE TO RELATED APPLICATION(S)

This application is a divisional application of allowed U.S. patent application Ser. No. 11/982,639 filed Nov. 2, 2007 and entitled ANODIC-CATHODIC CORROSION INHIBITOR-CONDUCTIVE POLYMER COMPOSITE.

BACKGROUND

An anodic-cathodic corrosion inhibitor-conductive polymer composite which may be used as a coating for providing corrosion protection is described herein.

Organic-inorganic hybrid composites which comprise an inorganic component and an organic conducting component are known in the art. The inorganic component inhibits deprotonation of the organic conducting component when the composite is exposed to a medium having a pH which would deprotonate the organic conducting component but for the presence of the inorganic component.

Coatings formed from such composites do not provide favorable corrosion protection due to their inability to arrest both anodic and cathodic corrosion reactions.

SUMMARY

It is desirable to stabilize anodic-cathodic corrosion inhibitor-conductive polymer composites so that coatings formed from such composites have a long life.

In accordance with the present disclosure, there is provided a conductive polymer corrosion protective coating which includes a conductive polymer with corrosion inhibitive pigments or additives comprising an anodic corrosion inhibitor and a cathodic corrosion inhibitor. The anodic corrosion inhibitor may be selected from the group consisting of compounds of vanadium, molybdenum, tungsten, and mixtures thereof. The cathodic corrosion inhibitor may be selected from the group consisting of cerium, neodymium, praseodymium, and mixtures thereof.

There is also provided a method for coating a substrate with an anodic-cathodic corrosion inhibitor-conductive polymer composite having an organic-inorganic hybrid composite and corrosion inhibitive pigments or additives comprising an anodic corrosion inhibitor and a cathodic corrosion inhibitor.

Other details of the anodic-cathodic corrosion inhibitor-conductive polymer composite, as well as other objects and advantages attendant thereto, will become more apparent from the following detailed description.

DETAILED DESCRIPTION OF THE PREFERRED EMBODIMENT(S)

As previously described, the instant disclosure relates to an anodic-cathodic corrosion inhibitor-conductive polymer composite which may be used for coatings to be applied to structures such as turbine engine components and other components that would benefit from the use of such coatings.

The composites comprise one or more organic conductive components and inorganic components. The composites may generally be in the form of particles having diameters within the range of between 0.1 microns to 5 mm. and for example between 0.1 microns to 125 microns. The particle size distribution of the organic-inorganic hybrid composite can be conveniently determined by any conventional techniques known in the art, such as by sieve analysis (for example for identifying coarse fractions), the Coulter Counter technique, or laser diffraction, applicable for measuring the distribution of finer particle fractions. It will be apparent to those skilled in the art that the particle size distribution of hybrids includes a wide range of size fractions as well as particle shape and morphology.

The organic conductive components and the inorganic components are intermixed and the hybrid composite is formed by the physical and/or chemical bonding between the two components. The microscopic structure of the particles can be comprised of an inorganic core with a conductive polymer shell, or optionally a conductive polymer core with an inorganic shell, or optionally an inorganic host with intercalated conductive polymer molecules, or optionally a conductive polymer host with inorganic dopants.

The conductive organic component may be selected from the group consisting essentially of inherently conductive polymers (ICP's). The inorganic component may be selected from the group consisting essentially of metal oxides, solid acids, metal salts of organic acids, inorganic phosphates, metal salts of metal anion complexes, or mixtures of the same. The composites have applications in organic coatings as well as in conductive plastics.

In one embodiment, the organic conductive component of the polymer comprises water-dispersable ICP's. Water dispersible ICP's are polymeric complexes of two strands of polymers: a conjugated polymer (e.g. polyaniline, polypyrrole, polythiophene, etc.) and, as the second strand, a polymer with sulfonic, carboxylic, or phosphoric acid functional groups. Examples of the second strand includes poly (butadiene maleic acid), poly (styrene sulfonic acid), poly (acrylic acid), poly (vinylmethylether-co-maleic acid), poly (vinlyphosphonic acid), etc.

In another embodiment, the inorganic components of the hybrid composites may be selected from the group consisting of metal oxides, solid acids, metal salts of organic acids, inorganic phosphoes, metal salts of metal anion complexes, and mixtures thereof. Examples of suitable inorganic oxides include the following: molybdenum oxide, tungsten oxide, vanadium oxide, manganese oxide, magnesium oxide, zinc oxide, and mixtures thereof.

Examples of suitable solid acids include molybdic acid, polymolybdic acid, tungstic acid, polytungstic acid, vanadic acid, and all the acids that can be generated from the above mentioned oxides.

In yet another embodiment, the hybrid composites may comprise micron or sub-micron size particles having a diameter within the range of between about 0.1 to 125 microns, for example 1 to 50 microns, in which the conductive organic components and inorganic components are intimately integrated and respond synergistically to the local chemical environment.

The inorganic components of the hybrid composites extend the pH-stability of the conductive organic component to a pH of >8 by obstructing deprotonation. For example, when subjected to an aqueous environment, the inorganic components can partially dissolve, thereby forming a H+ reservoir for the organic conducting component.

In still another embodiment, the hybrid composites may have physical characteristics similar to conventional pigment grade products intended for paint applications, have the combined properties of double-strand polyaniline and of non-chromate corrosion inhibitor pigments, and can be readily used in traditional primer and topcoat formulations.

Further, the hybrid composites have applications in the field of anti-corrosion coatings and anti-electrostatic coatings. For example, in composites of ICP and some inorganic oxides (ICP/oxide), or composites of ICP and inorganic solid acids (ICP/sold acid), the inorganic components can obstruct the deprotonation reaction of companion ICP components, thus rendering the ICP's useful as corrosion inhibitors or as anti-electrostatic components.

In yet another aspect, the ICP components of ICP/carbon components or ICP/metal composite components facilitate inter-particle electron transfer if dispersed in non-conductive hosts (such as plastics or ceramics), rendering the composites electrically conductive at relatively low composite loads. The hybrid composites can be used in anti- electrostatic, electrostatic dispersion and electromagnetic shielding applications.

In yet another aspect, the ICP component facilitates electron transfer to the anodic and cathodic corrosion inhibitive pigment constituents, enhancing the rate of solubility promoting oxidation or reduction reactions of these species.

In yet another aspect, the ICP component functions as an enhanced mass transfer network for ionic transport of both anionic and cationic corrosion inhibitive species.

In still another aspect, the inorganic component may comprise a solid acid core (an acidic oxide or an acidic salt) and the organic conductive component may comprise an inherently conductive polymer that is adsorbed to the solid acid core thereby forming the hybrid composite. The hybrid composite, wherein the solid acid cores function as consumable H+ reservoirs, possess enhanced resistency against deprotonation and extend the stability of the conductive form of the inherently conductive polymer in alkaline conditions.

In another aspect, the thickness of the ICP coating may be about 1 micron and the hybrid composite may have a mean diameter of greater than 9.7 microns.

In another embodiment, the thickness of the ICP coating may be about 2 microns and the mean diameter of the inorganic-organic hybrid composite may be greater than 19.4 microns.

In yet a further embodiment, the organic-inorganic hybrid composite may comprise an inorganic component and an organic conducting component. The inorganic component inhibits deprotonation of the organic conducting component when the composite is exposed to a medium having a pH which would deprotonate the organic conducting component but for the presence of the inorganic component. The composite is characterized in that the inorganic component comprises a matrix. The organic component is intercalated in the matrix.

In yet another embodiment, the organic-inorganic hybrid composite may comprise a guest-host complex wherein the inorganic component of the complex serves as the host or optionally the guest.

In another aspect, the organic-inorganic hybrid composite may comprise an inclusion complex wherein aggregates of the organic component are included in a matrix of the inorganic component or optionally aggregates of the inorganic component are included in a matrix of the organic component.

In yet another embodiment, the organic-inorganic hybrid composite may comprise a structure having at least two layers wherein at least one layer is comprised of the organic component and at least one layer is comprised of the inorganic component.

In one embodiment, the hybrid composites may form spontaneously in systems where finely divided solid cores, i.e.: solid acids, metal oxides or metal particles are dispersed into solutions or emulsions of ICP's, by intensive stirring at ambient or higher temperatures. The process can be carried out in aqueous or diverse organic mediums, where adsorption of the ICP spontaneously occurs resulting in formation of ICP coatings of uniform thickness on the surfaces of solid acid cores thereby yielding the hybrid composites.

The spontaneous process is driven by physical or acid-base type interactions between the solid acid cores and the ICP which take place at the solid/liquid interface and more specifically, on the surfaces of the solid acid cores. The adsorption process provides adherent and mechanically resistant ICP coatings of significant thickness. The inorganic organic composites are obtainable in pigment grades, as finely divided solids, processed by filtration, washing and drying (at reasonable temperatures) and grinding of the related dispersions.

To provide enhanced corrosion inhibition in service, corrosion inhibitive pigments or additives are added. The pigments or additives for example take the form of a corrosion inhibitive additive comprising an anodic corrosion inhibitor and a cathodic corrosion inhibitor. The inhibiting additive provides protection against both localized pitting corrosion and general corrosion. The anodic corrosion inhibitor may be selected from the group consisting of compounds of vanadium, molybdenum, tungsten, and mixtures thereof. The cathodic corrosion inhibitor may be selected from the group consisting of cerium, neodymium, praseodymium, and mixtures thereof.

Suitable additives which may be used as the pigments include cerous molybdate with bismuth vanadate, cerous molybdate with strontium tungstate, cerous phosphate with strontium tungstate, bismuth vanadate with bismuth molybdate and strontium tungstate, and mixtures thereof. Beneficial inhibiting additives are compounds of tungsten and cerium. Particularly beneficial inhibiting additives are those additives which comprise cerous and tungstate compounds.

A particularly useful inhibiting additive comprises an organic complex of inorganic cerium, such as cerous citrate. The use of this complex provides for solubility regulation of cerium in hydrated polymer solutions, and prevents the undesired side-reaction of cerium with the other synergistic corrosion inhibitors (molybdate, tungstate, etc.).

The composite may be dissolved or dispersed in any suitable carrier known in the art such as water.

A solution which can be used to apply the composite to a part needing protection may be formed by first dispersing the inorganic-organic component into a carrier such as water and thereafter dispersing the anodic and cathodic corrosion inhibitors into said carrier.

An example of an inorganic anodic/cathodic corrosion inhibitor is one which comprises 40 wt % cerous citrate, 40 wt % zinc molybdate, and 20 wt % strontium tungstate dispersed into a water solution of polypyrrole/poly (butadiene maleic acid) to form a conductive polymer bound corrosion inhibitive pigment capable of combined anodic and cathodic mode of corrosion inhibition.

The concentration of the anodic corrosion inhibitor and the cathodic corrosion inhibitor in the carrier should be between 5.0 and 250 grams/liter. A useful carrier has the concentration of the anodic corrosion inhibitor and the cathodic corrosion inhibitor between 15 and 150 grams/liter. The metal complexing agent may be present in a concentration of 2.0 to 250 grams/liter. A particularly useful composition has the metal complexing agent present in a concentration of 10 to 100 grams/liter.

The final product may consist of anodic and/or cathodic corrosion inhibitor between 1.0 to 50 wt % and the metal complexing agent between 0.1 and 1.0 mole fraction of combined inhibitors. The concentration of the conductive polymer is 1 to 10 wt % of the corrosion inhibitor, for example 2 to 4 wt %.

The conductive polymer constituent may have a coating composition between 0.01 and 2.0 microns. A useful constituent may have a coating composition between 0.05 to 0.5 microns. The hybrid composite coating may have a thickness between 1.0 and 125 microns. A useful thickness for the hybrid composite coating is between 2.5 and 125 microns. The anodic plus cathodic corrosion inhibitor would be present in an amount between 5.0 volt and 30 volt. The metal complexing agent may be in an amount of 0.1 to 1.0 mol fraction of combined inhibitor.

The composites of the present invention may be used in paint primers and adhesive bond primers which may be applied as a coating to a turbine engine component via any suitable spraying method known in the art. The turbine engine component may be a fan case or a nacelle.

It is apparent that there has been provided herein an anodic-cathodic corrosion inhibitor-conductive polymer composite. While the composite has been described in the context of specific embodiments thereof, other unforeseeable alternatives, modifications, and variations may become apparent to those skilled in the art having read the foregoing description. Accordingly, it is intended to embrace those alternatives, modifications, and variations as fall within the broad scope of the appended claims.

What is claimed is:

1. A method for providing corrosion protection to a substrate comprising the steps of:
   providing a substrate; and
   forming a conductive polymer corrosion protective composite comprising an organic-inorganic component comprising an inherently conductive polymer and an inorganic component and a corrosion inhibitive additive comprising an anodic corrosion inhibitor and a cathodic corrosion inhibitor wherein said anodic corrosion inhibitor is selected from the group consisting of compounds of vanadium, molybdenum, tungsten, and mixtures thereof, wherein the corrosion inhibitive additive is selected from the group consisting of cerrous molybdate with bismuth vanadate, cerrous molybdate with strontium tungstate, cerrous phosphate with strontium tungstate, bismuth vanadate with bismuth molybdate and strontium tungstate, cerous citrate, zinc molybdate, and strontium tungstate, and mixtures thereof, and wherein said anodic and cathodic corrosion inhibitor are present between 1.0 to 50 wt %, wherein the conductive polymer is present in a concentration of 1 to 10 wt % of the anodic and cathodic corrosion inhibitors, and wherein a metal complexing agent is present in an amount between 0.1 and 1.0 mole fraction of the combined inhibitors; and
   applying said conductive polymer corrosion protective composite to at least one surface of said substrate.

2. The method according to claim 1, wherein said substrate providing step comprises providing a turbine engine component.

3. The method according to claim 1, wherein said conductive polymer corrosion protective composite forming step comprises dissolving the anodic corrosion inhibitor and the cathodic corrosion inhibitor in a carrier containing said organic-inorganic component.

4. The method according to claim 3, wherein said anodic corrosion inhibitor and cathodic corrosion inhibitor dissolving step comprises dissolving enough of said anodic corrosion and cathodic corrosion inhibitors in said carrier so that there is a concentration of the anodic corrosion inhibitor and the cathode corrosion inhibitor in the range of from 5 to 250 grams/liter and a metal complexing agent is present in a concentration of from 2 to 250 grams/liter.

5. The method according to claim 3, wherein said anodic corrosion inhibitor and cathodic corrosion inhibitor dissolving step comprises dissolving enough of said anodic corrosion and cathodic corrosion inhibitors in said carrier so that there is a concentration of the anodic corrosion inhibitor and the cathode corrosion inhibitor in the range of from 15 to 150 grams/liter and a metal complexing agent is present in a concentration of from 10 to 100 grams/liter.

6. The method according to claim 1, wherein said applying step comprises applying said composite so as to form a coating having a thickness in the range of from 1.0 to 125 microns.

7. The method according to claim 1, wherein said applying step comprises applying said composite as part of a paint primer.

8. The method according to claim 1, wherein said applying step comprises applying said composite as part of an adhesive bond primer.

* * * * *